United States Patent

[11] 3,548,712

| [72] | Inventors | Theodore Dzus<br>West Islip;<br>Conrad J. Gunther, Uniondale, N.Y. |
|---|---|---|
| [21] | Appl. No. | 810,722 |
| [22] | Filed | Mar. 26, 1969 |
| [45] | Patented | Dec. 22, 1970 |
| [73] | Assignee | Dzus Fastener Co., Inc.<br>Islip, N.Y.<br>a corporation of New York |

[54] AUTOMATIC MACHINE FOR FORMING FASTENER ELEMENTS
17 Claims, 19 Drawing Figs.

[52] U.S. Cl. .................................................. 90/11,
90/11.46, 90/11.48, 90/56; 10/20.5
[51] Int. Cl. .................................................. B23c 3/32,
B23c 3/00
[50] Field of Search .......................................... 90/11, 56,
11.46, 11.48; 10/20.5, 11

[56] References Cited
UNITED STATES PATENTS

| 2,109,969 | 3/1938 | Dzus............................ | 90/13.9 |
| 2,482,729 | 9/1949 | Dzus............................ | 90/11 |
| 3,280,412 | 10/1966 | Hanneman et al............. | 10/20.5 |

Primary Examiner—Gil Weidenfeld
Attorney—Kane, Dalsimer, Kane, Sullivan and Kurucz

ABSTRACT: A machine is described which automatically forms stud fastener elements from blank studs. Blank studs are continuously fed to an indexing station where they are engaged by a first tool and rotated into an index orientation. The stud is then carried while in the index orientation to a slotting station where it is engaged by a second tool oriented with the stud and rotatably advanced between oppositely disposed cutters. The cutters generate slots of predetermined configuration in the stud shank to form the fastener element. The stud is thereafter withdrawn from the cutters and removed from the machine.

INVENTORS
THEODORE DZUS
CONRAD J. GUNTHER
BY
Kane, Dalsimer, Kane, Sullivan & Smith
ATTORNEYS

AUTOMATIC MACHINE FOR FORMING FASTENER ELEMENTS

BACKGROUND OF THE INVENTION

This invention relates to an automatic machine and, more particularly, to a machine which automatically cuts slots of predetermined shape in stud blanks to form fastener elements.

Conventional practice in forming stud fastener elements, such as those shown in U.S. Pat. Nos. 2,109,969 and 2,482,729, has been to use a manually operated machine whereby each stud is individually placed in the machine and advanced into a pair of opposing milling cutters which engage the stud shank and cut slots of predetermined curvature to serve as cam surfaces in the fastener element. The use of such manually operated machines requires the full attention and time of a worker since each blank stud must be individually inserted into the machine.

BRIEF SUMMARY

An automatic machine for forming fastener elements has now been developed which is capable of forming fastener elements from blank studs at a rate about four times faster than manual operated milling machines resulting in a substantial decrease in production costs. Moreover, this automatic machine is safer since it does not require manual insertion of stud blanks by the operator.

An object of this invention is to provide a machine for automatically forming stud fastener elements from blank studs.

Another object of this invention is to provide an automatic machine which can handle a continuous supply of blank studs, cut slots of predetermined design in the studs to form fastener elements, and then remove the fastener element from the machine.

Other objects and advantages will become apparent from the following description taken in conjunction with the accompanying drawings in which:

DESCRIPTION OF THE INVENTION

In accordance with this invention, an automatic machine is provided for forming stud fastener elements from blank studs. The blank studs are provided with hollow shanks and tool-engageable heads. In particular, means are provided for continuously feeding blank studs to an indexing station where the studs are supported while being oriented in an index position. The number of studs coming from the feed means is controlled to allow one stud blank to be indexed at a time and thus prevent jamming. A tool positioned adjacent the supported stud blank engages the stud head and orients the stud in the index position. Cooperating means are provided for moving the tool into and out of engagement with the stud and for imparting motion to the tool for orienting the stud.

A guide for supporting the stud shank during slotting is also provided along with means cooperating with the indexing tool for carrying the stud from the indexing station along a predetermined path to the slotting station, while maintaining the stud in the index orientation. The stud is then brought into supporting engagement with the guide positioned at the slotting station. A pair of spaced cutters are positioned adjacent the guide so that when the stud is engaged by the guide the stud shank will extend between the cutters to permit the cutters to engage the shank from opposing directions. A tool positioned adjacent the spaced cutters engages the stud heads in the index position and advances the stud shank between the cutters into cutting engagement therewith while rotating the shank through a predetermined angle to cause the cutters to produce slots of predetermined configuration. The tool for advancing the stud between the cutters cooperates with carrying means to engage the stud immediately after it is positioned in the guide and advance the stud between the cutters while rotating the stud through a predetermined angle. After the stud has travelled a predetermined distance between the cutters and has rotated through a predetermined angle, the guide and tool cooperate to withdraw the slotted stud from the milling cutters and allow the stud to fall to a collecting receptacle. This assembly therefore permits studs to be continuously fed to the machine, automatically slotted and then removed from the machine.

PREFERRED EMBODIMENT

Figure 5:
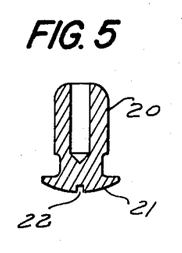
FIG. 5 is a sectional view of a blank stud with a hollow shank.
Figure 6:
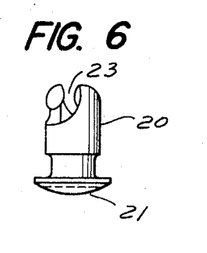
FIG. 6 is a side elevation view of the stud fastener elements after slot formation.
Figures 9, 10:
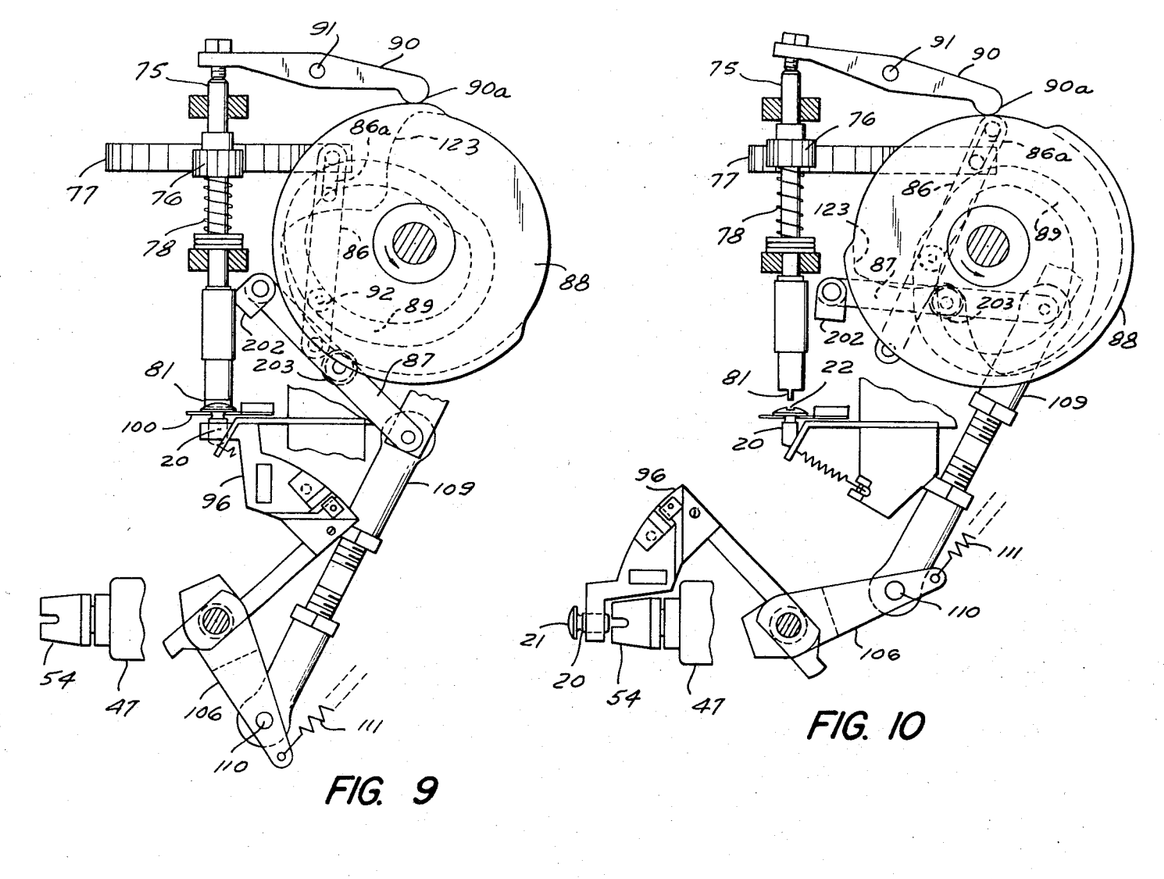
FIG. 9 is a side elevation view partly sectioned, of the feed jaws and assembly for moving the jaws between the stud index station and the milling station showing an indexed stud blank engaged by the feed jaws for carriage to the milling station.
FIG. 10 is a view similar to FIG. 9 showing the stud blank engaged by the feed jaws after carriage to the milling station for slotting.
Figure 13:
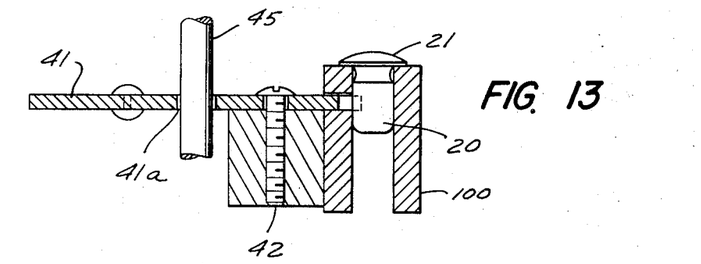
FIG. 13 is a transverse sectional view taken along the line 13-13 of FIG. 12.
Figure 14:
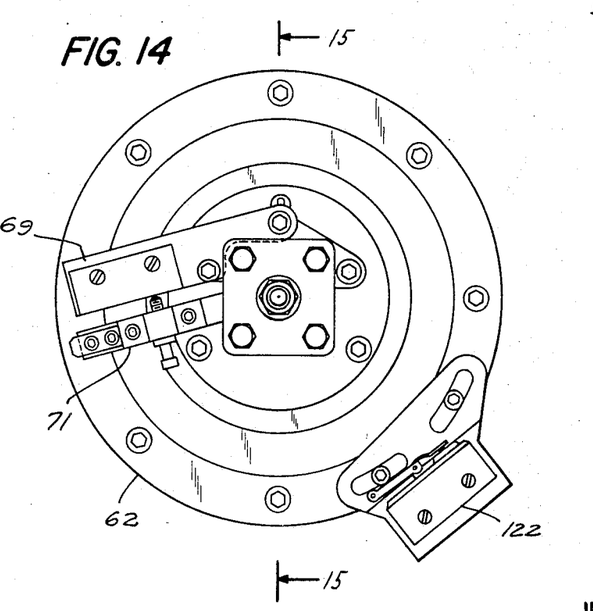
FIG. 14 is an end elevation view of the hydraulic drive unit for advancing and rotating the stud into the milling cutters and withdrawing the stud for removal from the machine.

Referring now to the drawings, FIG. 5 shows a blank stud 20 with a hollow shank having a kerf 22 in stud head 21. An overall understanding of the automatic milling machine and its operation on stud 20 can be gained initially be reference to FIGS. 1 and 7. As there shown, blank studs 20 are contained in vibrating hopper 31 and are fed continuously down feed chute 32 to the indexing station onto support member 100. Stud 20 is thus supported at head 21 and is free to rotate in the plane of head 21 as shown in FIG. 13. Tool 81 has a blade or screw driver type head which engages kerf 22 of stud head 21 to rotate the stud into an indexed position. FIGS. 9 and 10 show how tool 81 rotates under the control of rack 77 and pinion 76. Rack 77 connects through slot 86a to arm 86 and cam follower 92. Cam follower 92 rides in track 89 positioned on the side of cam disc 88. As cam 88 rotates, rack 77 is caused to move laterally in response thereto which in turn rotates pinion 76 and tool 81 in the plane of stud head 21 perpendicular to the axis of the stud shank.

As tool 81 is rotated it is urged downwardly into engagement with stud blank 20 by connecting mounting 80 under the action of spring 84 which is anchored by lug 85. After stud blank 20 is rotated into the index position, tool 81 disengages and feed jaw assembly 96 engages stud blank 20 (shown in detail in FIG. 9) and carries stud blank 20 through an arc of approximately 90° to place it in engagement with stud or milling guide 54 for slotting. FIG. 10 shows the details of carriage of stud 20 when moved through 90° into engagement with milling guide 54.

Figure 1:
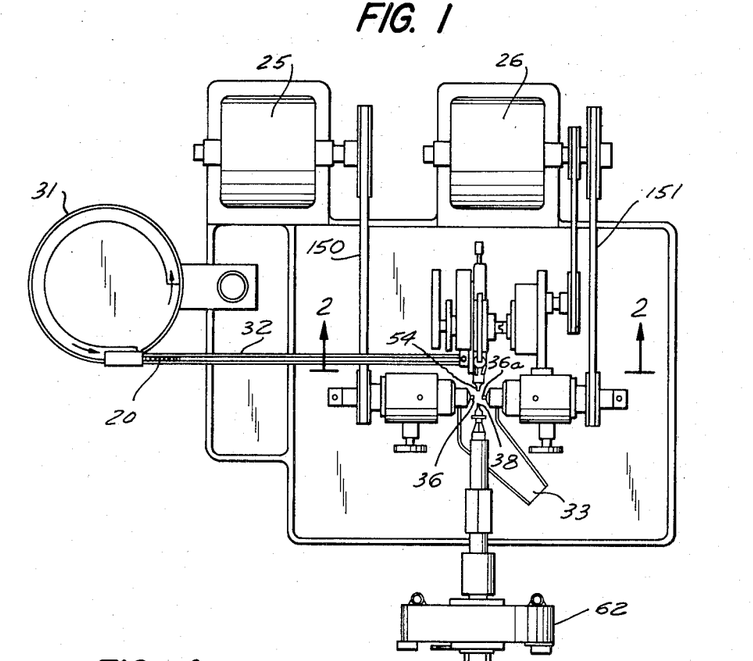
FIG. 1 is a top plan view of the complete machine.
Figure 4:
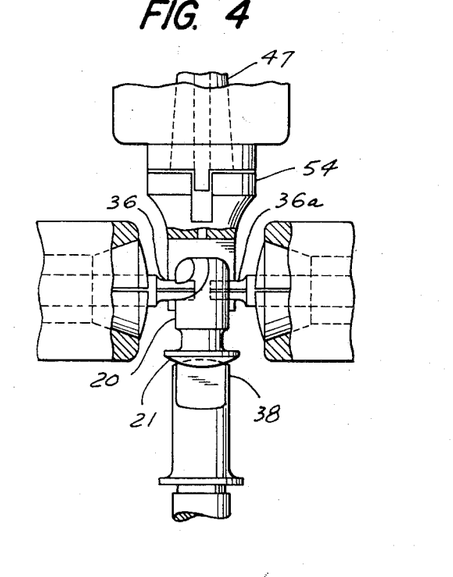
FIG. 4 is a fragmentary, partly sectioned, view of the stud being slotted by milling cutters.

FIGS. 1 and 4 show that as stud 20 is brought into engagement with milling guide 54, tool 38, aligned with the index position of stud 20, engages kerf 22 of stud head 21. When stud 20 is engaged by milling guide 54, the stud shank extends between milling cutters 36 and 36a to permit the cutters to engage the stud shank from opposing directions. Milling cutters 36 and 36a are rotated by motors 25 and 26, respectively, for slotting of stud 20. The distance separating milling cutters 36 and 36a is slightly less than the diameter of the stud shank. Tool 38 moves in cooperation with the feed jaw assembly 96 and advances stud 20 between the milling cutters while at the same time rotating stud 20 through a predetermined angle. This permits milling cutters 36 and 36a to cut separate slots in the stud shank. After stud 20 has been advanced a predetermined distance, and rotated through a predetermined angle, it is withdrawn automatically by reverse movement of tool 38 in cooperation with the spring action of milling guide 54 while being rotated in the reverse direction. Stud 20 is then permitted to drop downwardly into collecting chute 33 which in turn can feed a collecting receptacle not shown.

FIGS. 9 and 10 illustrate the details of the camming mechanisms and cooperation between tool 81 and feed jaw assembly 96. Rocker arm 90 which rocks on shaft 75 and pivots about shaft 91 connects through shaft 75 to pinion 76. Pinion 76 connects through shaft 75 to tool 81 and is vertically movable under the tension of spring 78. FIG. 9 shows cam follower 90a of rocker arm 90 riding on the high point of cam 88. As cam 88 rotates counterclockwise, track 89 rotates with it and cam follower 92, riding in track 89, causes rack 77 to move from left to right. FIG. 10 shows rack 77 moved to the right from the position shown in FIG. 9. This causes pinion 76 to rotate and, through shaft 75, to cause tool 81 in engagement with stud 20 to rotate stud 20 into an indexed position for alignment with tool 38. As rack 77 continues to move to the extreme right, cam follower 90a rides downwardly from the high spot of cam 88 into the valley or low spot causing pinion 76 to move vertically upward in rack 77. This in turn causes tool 81 to be lifted upwardly out of engagement with kerf 21 of stud 20. Tool 81 connects to mounting 80 and moves under the tension of spring 84 which is anchored at lug 85. Thus, after stud 20 is rotated into the index position, tool 81 is disengaged and does not cause further rotation. The width of the teeth of pinion 76 and rack 77 are such that they will remain in mesh despite axial movements of shaft 75 as shown in FIGS. 9 and 10.

Figure 2:
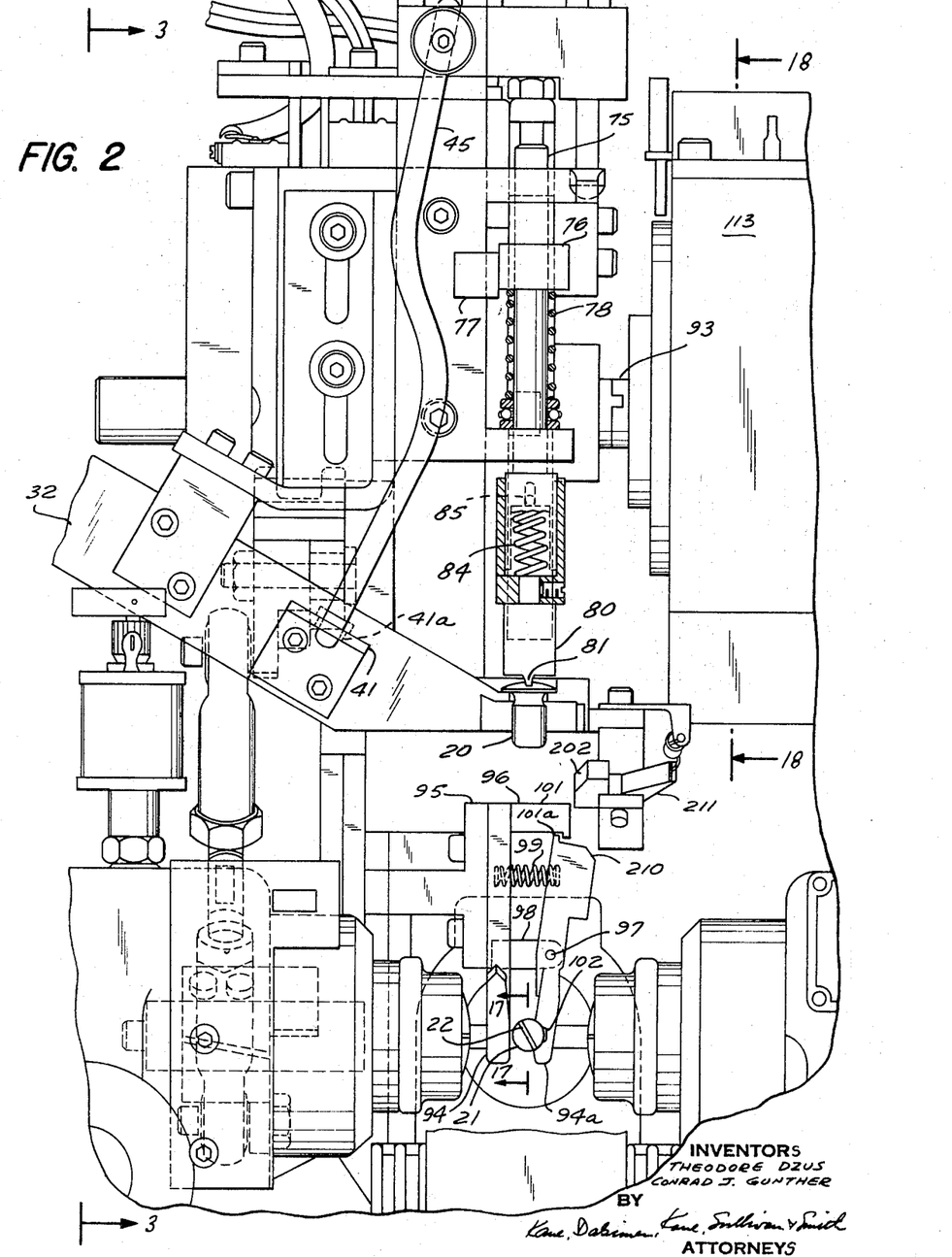
FIG. 2 is a transverse sectional view taken along the line 2-2 of FIG. 1.

Feed jaw assembly 96 is best shown in FIGS. 2, 3, 8, 9 and 10. In FIG. 2, jaw member 94 is affixed to base 95 while jaw member 94a is pivotally supported at 97. Spring 99 is interposed between jaw members 94 and 94a to urge the rear extensions of these jaw members apart which in turn urges the stud engaging opposite ends together for facilitating gripping of stud 20 during carriage between the indexing station and the slotting station. Stop member 101 is fastened to member 94 and extends in the direction of jaw member 94a to cooperate with member 101a of jaw member 94a and limit jaw movement. Notch 102 is formed in the gripping face of jaw 94a and presents surfaces which will engage shank 20 of the stud for purposes of centering.

The jaw assembly shown in FIGS. 9 and 10 has two extremes of movement. FIG. 9 shows the jaws in the upper position underlying support member 100 of the indexing station. In the lower position, the jaws align with milling guide 54 and tool 38 of the milling station. In moving to the upper position, jaw assembly 96 rocks around pivot 97 (shown in FIG. 2), which in turn causes cam surface 210 to engage cam surface 202 of pawl 211. The engagement of cam surfaces 210 and 202 moves the rear extension of jaw member 94a in the direction of jaw member 94 to open the jaw assembly and hold the jaws in the open position until stud 20 is engaged in notch 102. Further upward movement of the jaws is prevented when arm 103 strikes stop 130 shown in FIG. 3. After stud 20 is rotated into the index position, it is gripped between jaw members 94 and 94a in notch 102 and moved to the position shown in FIG. 10 in which it engages milling guide 54 and tool 38.

Figure 3:
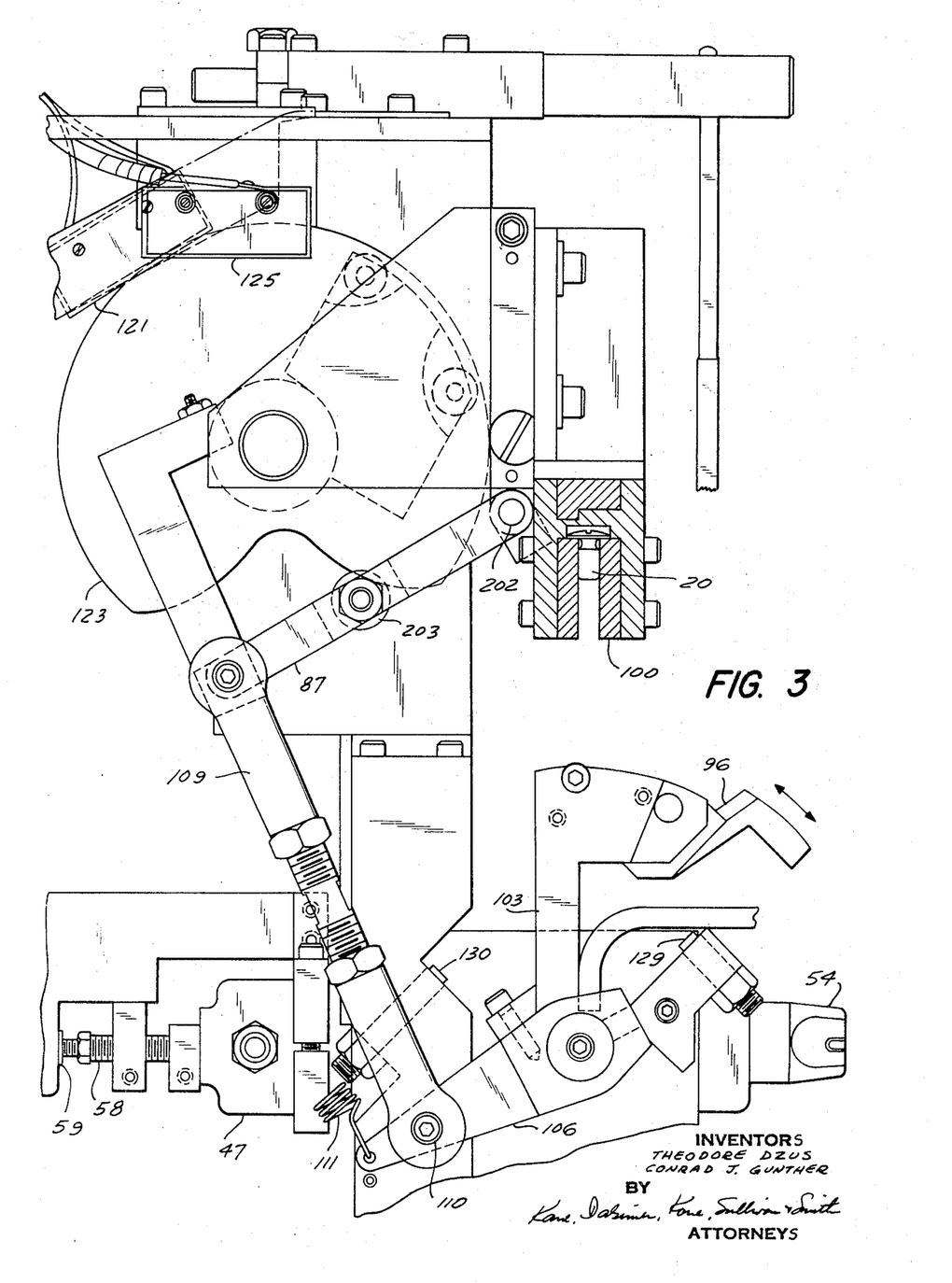
FIG. 3 is a sectional side view taken along the line 3-3 of FIG. 2.

Further downward movement is prevented when arm 103 strikes stop 129 as shown in FIG. 3. Stud 20 is then advanced into milling cutters 36 and 36a.

Figure 8:
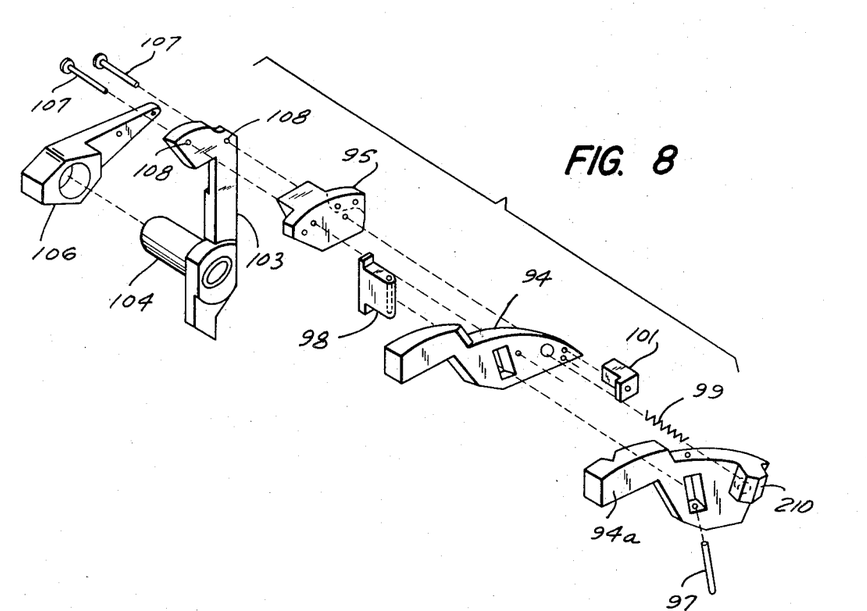
FIG. 8 is an exploded perspective view of the feed jaws assembly.

The detailed structure of jaw assembly 96 is shown in FIG. 8 which presents components in separated positions. FIG. 8 shows supporting arm 103 provided with hub 104. Hub 104 rotates in engagement with support element 106. Pins or rivots 107 extend through openings 108 in the head of arm 103 and member 95 to join the jaw member assembly together. Pin 97 pivots in support bracket 98 to open and close jaw members 94 and 94a.

Figure 7:
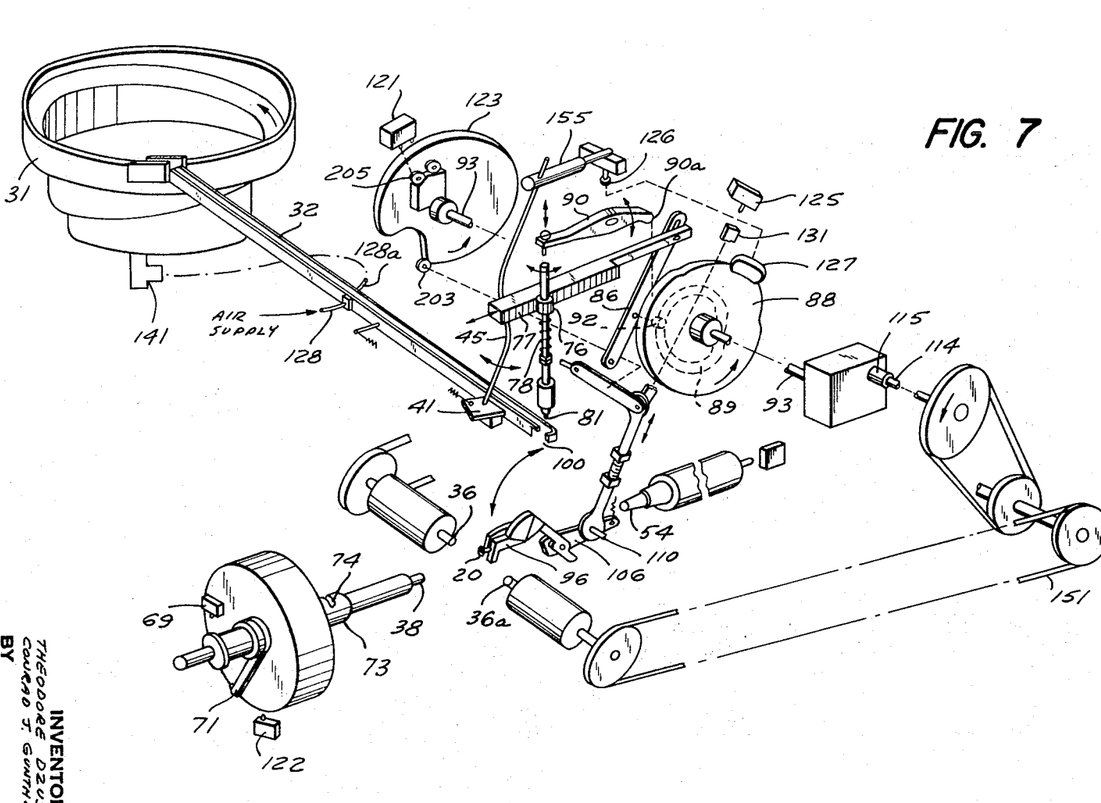
FIG. 7 is an exploded perspective view of the principal elements of the machine.

Cam 123 causes movement of the feed jaws so that they travel from a position adjacent the index station at the end of the chute 32 and support member 100. FIGS. 7, 9 and 10 show adjustable rod 109 pivotally attached at 110 to arm 106. Rod 109 is urged in the direction of cam 123 (rotatably mounted on shaft 93) which is permanently anchored by spring 111. Arm 87 pivotally connects between stationary mount 202 and rod 109. As cam 123 rotates, cam follower 203 mounted on arm 87 follows cam 123 causing jaw assembly 96 to carry stud 20 between the index station and the slotting or milling station.

Cam shaft 73 having cam surface 74 controls the generation of cam slots in the stud shanks. As shown in FIG. 7, tool 38 will advance and rotate according to cam 74 and will withdraw and reverse rotation according to cam 74. This achieved by having cam shaft 73 retained in the rotor bore by pin 118 (shown in FIG. 16) extending through the shaft to which are attached rollers 119. These rollers ride back and forth within the slots 120.

Figure 15:
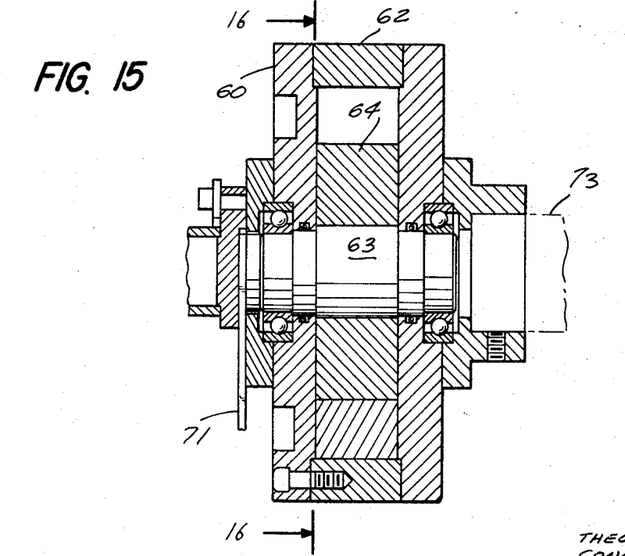
FIG. 15 is a transverse sectional view taken along the line 15-15 of FIG. 14.
Figure 16:
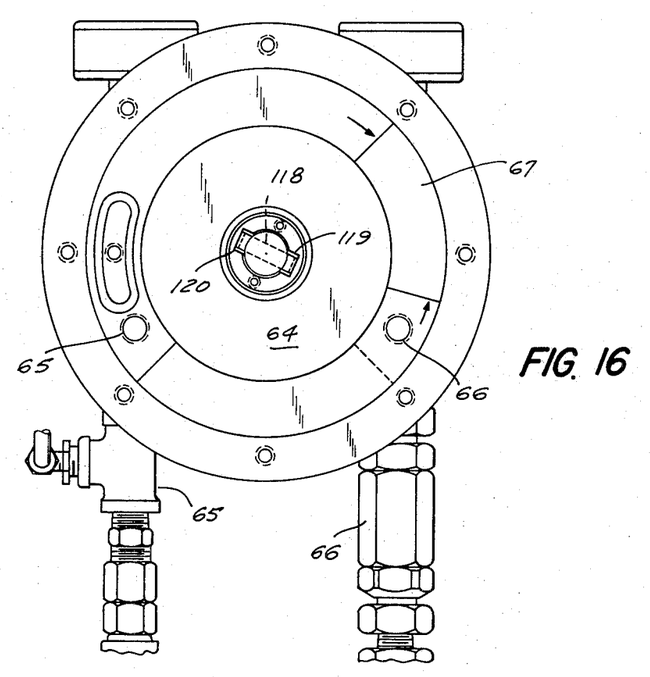
FIG. 16 is a sectional view taken along the line 16-16 of FIG. 15.

FIGS. 15 and 16 show the assembly for maintaining liquid under pressure entering casing 62 through pipe 65, and vane 67 which will cause tool 38 due to cam 74, to be advanced and rotated in a clockwise direction. Accordingly, a stud engaged by tool 38 will be moved in a corresponding manner. As the stud is moved between the milling cutters, the cutters engage the stud shank from opposite directions to cut separate slots therein of desired configuration. As the introduction of liquid through pipe 65 ceases, and liquid flows through pipe 66, vane 67 will reverse its movement causing tool 38 to withdraw or retract while rotating tool 38 in a counterclockwise direction in accordance with the configuration established by master cam surface 74.

Starting the machine with the feed jaws in their lower position, switch 125 (shown in FIG. 7) is activated by actuator 131. This opens a three-way solenoid valve (not shown) to let hydraulic fluid enter through pipe 65 causing drive shaft 63, rotor 64 and tool 38 to turn in a clockwise direction. Actuator 71 will turn in synchronism therewith. As tool 38 rotates it will move outwardly under the action of the master cam with which it is associated to engage kerf 22, or other tool-engaging surface of the stud head. When so engaged, actuator 71 will trip switch 122 causing magnetic clutch 115 to engage, which in turn rotates cam shaft 93 to initiate the feed cycle.

Shaft 93 turns slot index cam 88, and feed cam 123. Rotation of cam 123 causes feed jaw assembly 96 to shift to a position adjacent support member 100 and grasp stud 20 for carriage from the indexing station to the milling station. Rotation of cams 123 and 88 ceases as roller 205 actuates switch 121 to disconnect clutch 115. During this cycle cam track 89 will have caused rack 77 to reciprocate and thus rotate tool 81. Accordingly, the stud will be rotated to dispose kerf 22 of stud head 21 in proper position with reference to the screwdriver-type blade of tool 38 to permit ready indexing engagement. Further rotation of shaft 93 does not occur until switch 122 is again activated while the milling cycle continues until switch 69 is operated by actuator 71.

With such operation, one three-way valve (not shown) is closed and another opened. Liquid will then enter through pipe 66 causing the rotor and connected tool to turn in a counterclockwise direction. During such rotation switch 122 will again be operated and energize magnetic clutch 115. This results in the jaws moving downwardly while gripping stud 20 in the index position. Cam 127 then shifts bar 45 through cam follower 126 and lever 155 to cause delivery of a new stud to support member 100 of the indexing station.

When the feed jaws are in their lower most position, switch actuator 205 contacts switch 121 to disconnect clutch 115 and activate switch 125 which initiates a new milling cycle. Switches 69, 121, 122 and 125 electrically connect to conventional relay circuits to actuate both three-way valves in synchronization and with the magnetic clutch.

To obtain a proper number of studs in chute 32, a control is provided. As shown in FIG. 7, tube 128 connects to one side of chute 32 and aligns with tube 128a on an opposite side of the chute. Switch 141 controls the operation of hopper 31 and causes the delivery of studs to the chute. When these studs lie within the chute above lever 41 to a height above tubes 128 and 128a, air flow to switch 141 will be obstructed. Accordingly, hopper 31 will not be vibrating and studs will not be fed to the upper chute end. As lever 41 delivers studs to the lower chute end the number of elements above the lever will diminish so that passage of air to switch 141 will be initiated and hopper 31 will vibrate and deliver studs to the upper chute end. This will continue until obstruction to air flow again occurs. The entire cycle operation is repeated consistent with the operating speed of the machine.

Figures 11, 12:
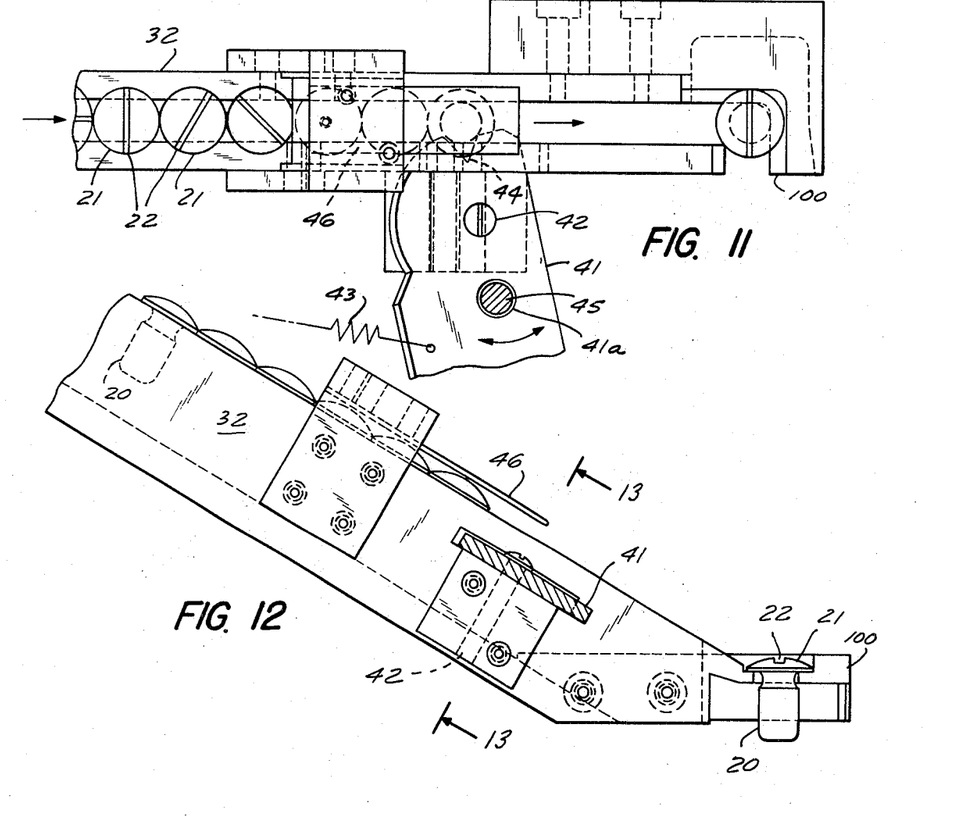
FIG. 11 is a fragmentary plan view of the feed chute.
FIG. 12 is a side elevation view of the feed chute.

As shown in FIGS. 11, 12 and 13 delivery chute 32 preferably takes the form of a pair of strips spaced from each other a distance slightly greater than the shank diameter of stud 20 having an upper edge 46. The lower surfaces of the stud heads bear in sliding engagement with the upper strip edge. At the lower end of chute 32 is support member 100 formed from an extension of the side strip cornered at a right angle. Support member 100 provides an exit zone adjacent the index station and retains stud 20 in supporting engagement to permit tool 81 to rotate stud 20 into the index position.

To control delivery of studs to the exit, a stop is provided. This involves a lever 41 pivotally mounted at 42 and movable between a stud retaining position and a position permitting a single stud to advance to the index station (shown in detail in FIGS. 11 and 12). Spring 43 connects with the outer edge of the lever and urges it into clockwise rotation. The inner edge of that lever extends through a slot in the chute strip to a sufficient distance beyond the strip to arrest movement of a stud past that point. The edge of the lever at this zone is formed with a notch 44. The depth of the notch is such that the lowermost stud above it may partially enter the notch when the lever shifts in a counterclockwise direction to the limit of its movement. Under these conditions, sufficient space will exist for the stud to move with the lever when it rocks in a clockwise direction. As continuing movement occurs, the stud will shift free of the notch and proceed down the chute.

Control rod 45 freely passes through slot 41a in lever 41 and serves to shift lever 41 to the extreme of its movement in a counterclockwise direction. Spring 43 causes movement of the lever in the opposite direction. Shield plate 46 overlies the chute in advance of this station to assure that the stud heads bear in firm contact with the upper chute edges. Control rod 45 connects through lever 155 to cam follower 126. Cam 127 is connected to cam disc 88 and rotates therewith. Cam follower 126 is moved by cam 127 on each rotation of cam disc 88 causing control rod 45 and lever 41 to move accordingly.

Figures 17, 18:
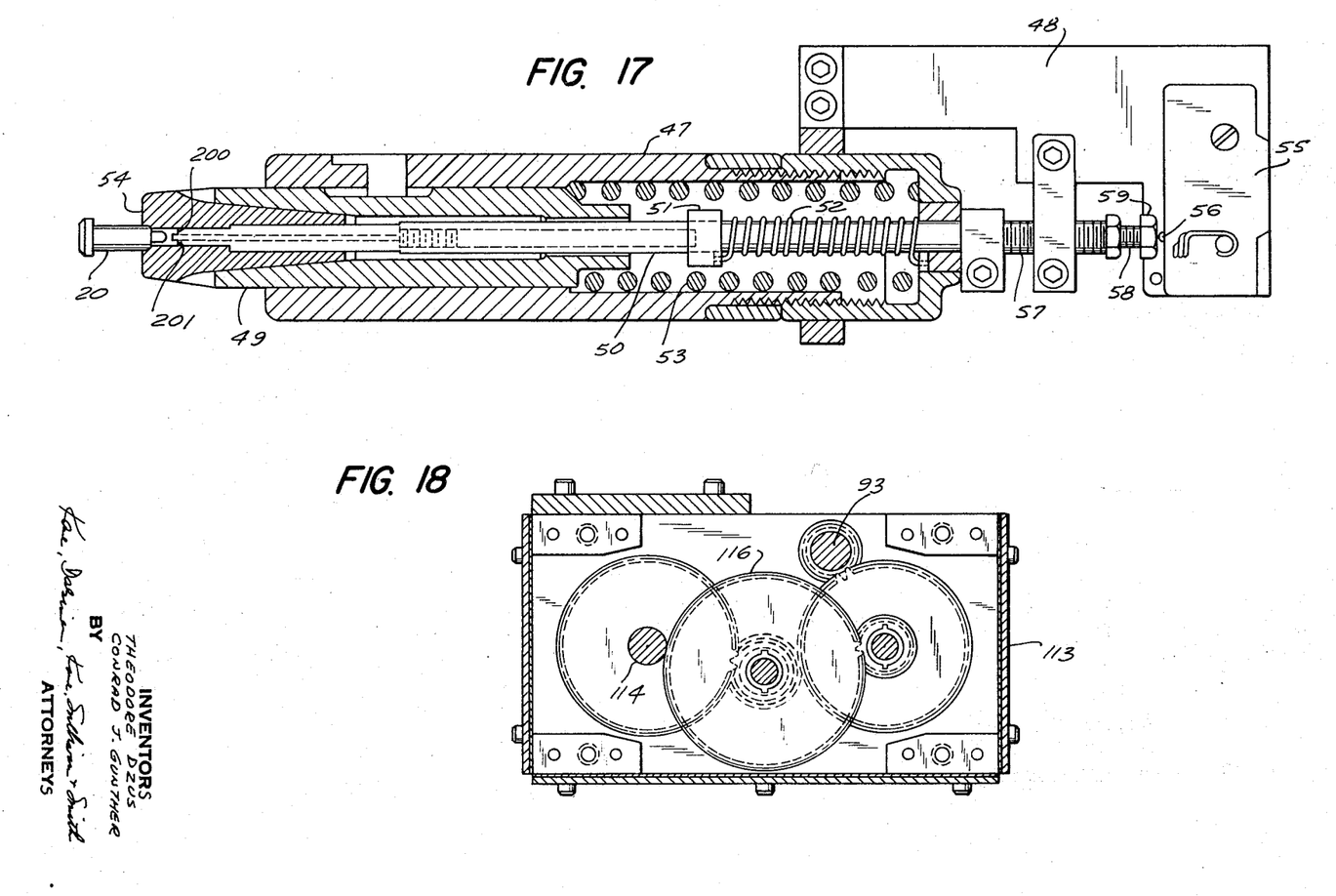
FIG. 17 is an enlarged sectional view of the milling guide taken along the line 17-17 of FIG. 2.
FIG. 18 is a sectional view of the reduction gearing assembly taken along the line 18-18 of FIG. 2.

FIG. 17 shows casing 47 of milling guide 54. Sleeve 49 is movable in the outer casing and is keyed thereto and will move forward and back only against the action of spring 53. Bracket 48 supports switch 55 and also acts as a rotation stop for the lever of rod 50. Rod 50 provided with collar 51 is movable within sleeve 49 and is encircled by spring 52 which has one end attached to collar 51 and its opposite end to a continuation of the casing. Rod 50 is threaded at the end 57 and has a threaded bore. A correspondingly threaded stem 58 extends into the bore and engages the thread. The end of the stem terminates in head 59. Switch 55 is mounted on the rear end of bracket 48 and actuator 56 for the contained switch which extends beyond the casing in line with head 59.

During slotting, cam shaft 23 of shank 20 engages prongs or projections 200 and 201 in the end of rod 50 to rotate rod 50 while cam slots are being milled. However, if there is a broken cutter, then there will be no slot formed in the shank of stud 20 to engage the projections. In this case, rod 50 will not rotate but will move in a straight line back and actuate the switch 55 which opens the control circuit and stops the machine from operating. The lever on the threaded portion of rod 50 acts as a stop to limit return rotation.

FIG. 18 shows gear reduction assembly unit 113 and gear train 116 connecting to cam shaft 93 and drive shaft 114.

Figure 19:
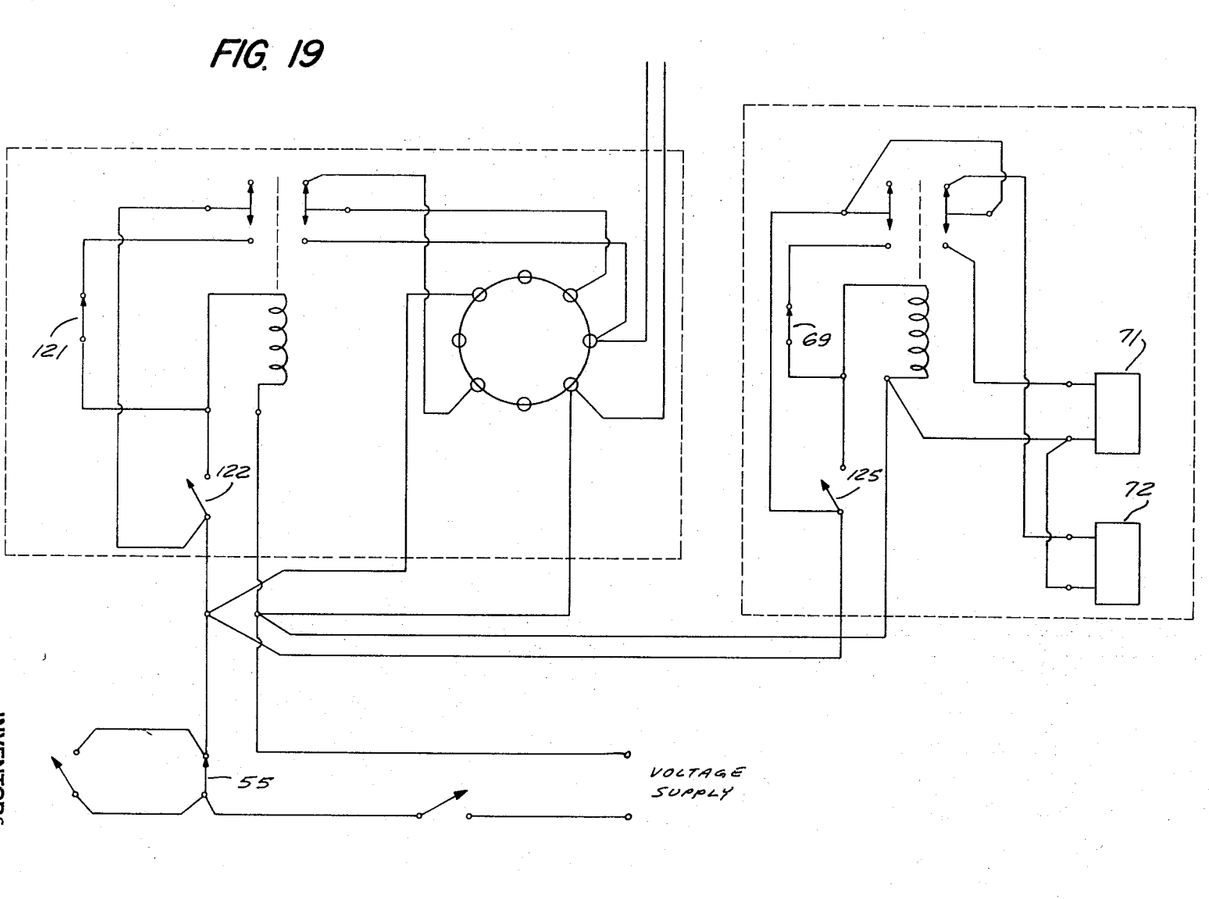
FIG. 19 is a schematic electric circuit wiring diagram for the automatic milling machine.

FIG. 19 shows a schematic wiring layout for the machine. It is to be noted that switches 69 and 125 connect directly to solenoids 71 and 72 to control the flow of liquid through pipes 65 and 66.

FIG. 1 is a top plan view of the milling machine showing the overall layout. Electric motors 25 and 26 operating milling cutters 36 and 36a through drive belts 150 and 151 respectively.

Although the present invention has been described in conjunction with a preferred embodiment, it is to be understood that modifications and variations may be resorted to without departing from the spirit and scope of the invention as those skilled in the art will readily understand.

We claim:

1. An automatic machine for forming stud fastener elements from blank studs provided with hollow shanks, which comprises:

an indexing station including a member for supporting the stud during indexing;

means for continuously feeding studs to the indexing station;

means for controlling the number of studs coming from the feed means;

a first tool positioned adjacent the support member for engaging the stud and orienting the stud in a predetermined index position;

means cooperating with the feed control means for moving the first tool into and out of engagement with the stud;

means cooperating with the feed control means and the first tool moving means to impart motion to the first tool for orienting the stud;

a slotting station including a guide for supporting the stud shank during slotting;

means cooperating with the first tool for carrying the stud from the indexing station along a predetermined path to the slotting station and into supporting engagement with the guide while maintaining the stud in the index orientation;

spaced cutters positioned adjacent the stud guide so that when the stud is engaged by the guide the stud shank will extend between the cutters to permit the cutters to engage the shank from opposing directions;

a second tool positioned adjacent the cutters for engaging the stud in the index orientation and advancing the stud shank between the cutters into cutting engagement therewith while rotating the shank through a predetermined angle to cause the cutters to produce slots of predetermined configuration to form the stud fastener element; and means cooperating with the carrying means for rotating and advancing the second tool and stud in the direction of the cutters when the stud is engaged between the second tool and the guide and then withdrawing the stud from the cutters and reversing rotation after the stud has travelled a predetermined distance and rotated through a predetermined angle to disengage the stud from the second tool and guide, whereby studs continuously fed to the machine are automatically indexed, slotted and then removed from the machine.

2. An automatic machine in accordance with claim 1 wherein the stud is provided with a tool-engageable head to permit the first tool to engage the stud head and rotate the stud into the index position.

3. An automatic machine in accordance with claim 2 wherein the means for imparting motion to the first tool for orienting the stud include a rack and pinion assembly for rotating the first tool in the plane of the stud head.

4. An automatic machine in accordance with claim 3 wherein the means for carrying the stud between the indexing and slotting stations include a pair of stud-engageable jaws.

5. An automatic machine in accordance with claim 4 wherein the tool-engageable head of the stud head includes a kerf and the first and second tools are provided with blades for engaging the kerf of the stud head.

6. An automatic machine in accordance with claim 5 wherein the means for carrying the stud include first cam surfaces cooperating with the first tool for moving the jaws between the indexing and slotting stations.

7. An automatic machine in accordance with claim 6 wherein the jaw assembly includes at least one pivotable jaw member, a spring connected thereto, and a pawl so that when said jaw member engages the pawl the jaws are caused to open for receipt of a stud blank at the indexing station and to close on the stud under the action of the spring.

8. An automatic machine in accordance with claim 7 wherein the rack and pinion assembly for rotating the first tool for orienting the stud in the index position has the rack connecting through a cam follower to a second cam surface which cooperates with the first cam surface, and the pinion connecting to the first tool.

9. An automatic machine in accordance with claim 8 wherein the means for moving the first tool into and out of engagement with the stud comprises a spring connecting to the first tool to move the tool vertically, said spring connecting to a pivotally mounted rocker arm assembly provided with a cam follower for engaging a third cam surface cooperating with the first and second cam surfaces to cause the first tool to move downward to engage the stud head and upward to disengage the stud head after the stud is oriented in the index position.

10. An automatic machine in accordance with claim 9 wherein the feed control means comprises:
 a vibratile hopper;
 a feed chute connecting the hopper with the indexing station; and
 a stud-engageable lever positioned adjacent the feed means which is movable between a stud retaining position and a position which allows a single stud to advance to the indexing station, said lever connecting through a cam follower to a fourth cam surface cooperating with the first, second and third cam surfaces to cause the lever to move between the stud retaining and stud advancing positions.

11. An automatic machine in accordance with claim 10 wherein the first and third cam surfaces comprise the outer surfaces of a pair of cam discs joined by a common shaft for cooperative movement.

12. An automatic machine in accordance with claim 11 wherein the second cam surface comprises a cam track positioned on a side of the third cam disc, and the fourth cam surface comprises a member connected to the third cam disc and movable therewith.

13. An automatic machine in accordance with claim 12 including means carried by the guide to cause interruption of the operation of the machine if a stud is accidentally not carried to the slotting station or improperly engages the guide.

14. An automatic machine in accordance with claim 13 wherein the means for interrupting operation of the machine includes a control switch and a movable member having projections for engaging the shank end of the stud, said member extending rearwardly from the projections to a point adjacent the control switch so that if the stud does not properly engage the projections, the member will be moved rearwardly into engagement with the control switch to cause the control switch to open and interrupt the operation of the machine.

15. An automatic machine in accordance with claim 14 wherein the means for controlling the number of studs coming from the hopper comprises:
 an air switch and assembly for controlling the number of studs coming from the hopper;
 a fourth cam surface moving in cooperation with the aforesaid cam surfaces; and
 a control lever assembly positioned adjacent the feed chute and engaging the fourth cam surface so that when a blank stud is removed from the indexing station for carriage to the slotting station, another blank stud is engaged by the control lever and advanced to a position where it is free to move down the feed chute to the indexing station.

16. An automatic machine in accordance with claim 15 including means for rotating the cutters.

17. An automatic machine in accordance with claim 16 wherein the means for rotating and advancing the second tool include a hydraulic assembly comprising:
 a vane movable with the tool;
 a valve for controlling and reversing the direction of hydraulic flow against the vane; and
 a valve control switch so that when the switch is actuated, the valve will allow hydraulic fluid to flow against the vane to cause the second tool to rotate and move in predetermined directions.